United States Patent
Tsai et al.

(10) Patent No.: US 9,429,697 B2
(45) Date of Patent: *Aug. 30, 2016

(54) BACKLIGHT MODULE

(71) Applicant: Global Lighting Technologies Inc., Taoyuan (TW)

(72) Inventors: Chung-Lin Tsai, Taoyuan (TW); Jiun-Hau Ie, Taoyuan (TW); Jerry Wu, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/838,289

(22) Filed: Aug. 27, 2015

(65) Prior Publication Data

US 2015/0369996 A1 Dec. 24, 2015

Related U.S. Application Data

(63) Continuation-in-part of application No. 14/606,031, filed on Jan. 27, 2015, which is a continuation-in-part of application No. 13/911,102, filed on Jun. 6, 2013, now Pat. No. 9,004,737, which is a continuation-in-part of application No. 13/172,882, filed on Jun. 30, 2011, now Pat. No. 8,480,286, which is a continuation-in-part of application No. 12/464,104, filed on May 12, 2009, now Pat. No. 7,997,784.

(51) Int. Cl.
*F21V 8/00* (2006.01)
*B29K 101/12* (2006.01)

(52) U.S. Cl.
CPC .............. *G02B 6/0021* (2013.01); *G02B 6/009* (2013.01); *G02B 6/0046* (2013.01); *G02B 6/0065* (2013.01); *G02B 6/0068* (2013.01); *G02B 6/0073* (2013.01); *G02B 6/0083* (2013.01); *G02B 6/0085* (2013.01); *B29K 2101/12* (2013.01); *B29K 2995/0026* (2013.01)

(58) Field of Classification Search
CPC G02B 6/0021; G02B 6/0046; G02B 6/0065; G02B 6/0068; G02B 6/0073; G02B 6/0083; G02B 6/0085; G02B 6/009
See application file for complete search history.

(56) References Cited

U.S. PATENT DOCUMENTS

| 2004/0105265 | A1* | 6/2004 | Takizawa | G02B 5/223 362/293 |
| 2009/0016079 | A1* | 1/2009 | Mizutani | G02B 6/0021 362/617 |
| 2012/0170317 | A1* | 7/2012 | Tsai | G02B 6/0021 362/621 |

* cited by examiner

*Primary Examiner* — Mary Ellen Bowman
(74) *Attorney, Agent, or Firm* — Jianq Chyun IP Office

(57) ABSTRACT

A backlight module including a light guide plate, a circuit layer and at least one light source. The light guide plate includes a first surface, a second surface parallel and opposite to the first surface, and a recess disposed at a side edge of the light guide plate and including a third surface parallel to the first surface and the second surface. The circuit layer is integrated with the third surface. The at least one light source is disposed on the third surface to be embedded in the recess and electrically connected to the circuit layer.

20 Claims, 4 Drawing Sheets

BACKLIGHT MODULE

CROSS-REFERENCE TO RELATED APPLICATION

This application is a continuation-in-part application of and claims the priority benefit of U.S. prior application Ser. No. 14/606,031, filed on Jan. 27, 2015, now pending. This prior application Ser. No. 14/606,031 is a continuation-in-part application of and claims the priority benefit of a prior application Ser. No. 13/911,102, filed on Jun. 6, 2013, now patented as U.S. Pat. No. 9,004,737, which is a continuation-in-part application of and claims the priority benefit of a prior application Ser. No. 13/172,882, filed on Jun. 30, 2011, now patented as U.S. Pat. No. 8,480,286, which is a continuation-in-part application of and claims the priority benefit of U.S. patent application Ser. No. 12/464,104, filed on May 12, 2009, now patented as U.S. Pat. No. 7,997,784. The entirety of each of the above-mentioned patent applications is hereby incorporated by reference herein and made a part of this specification.

TECHNICAL FIELD

The technical field generally relates to a backlight module. More particularly, the technical field relates to a backlight module having at least one light source embedded in a light guide plate.

BACKGROUND

A light guide plate is a key part of a backlight module, and the way to produce a light guide plate includes injection, embossing and extrusion. In general, a light emitting diode (LED) or a light source is arranged on the edge of the light guide plate, and the light emitted by the LED or the light source comes out uniformly from the surface of the light guide plate.

In a backlight module, everything else is supportive of the light guide plate, for example, a back reflector, a diffuser, and brightness enhancement films such as prismatic films which disposed on the top of the light guide plate to help narrowing viewing angles, which makes the light brighter or collimated. For the backlight module, there are a lot more components other than the light guide plate, such as printed circuit board (PCB), flexible printed circuit board (FPC), LEDs, wires, connectors, housings, metal-stamped or plastic frames, labels, etc. However, everything is surrounding the heart of the backlight module, which is the light guide plate.

The cited references of the prior art are listed below and considered irrelevant: U.S. Pat. No. 8,338,849, U.S. Pat. No. 8,384,114, U.S. Pat. No. 8,384,121, U.S. Pat. No. 8,466,488, U.S. Pat. No. 8,511,883, U.S. Pat. No. 8,3653,539, U.S. Pat. No. 8,680,567, U.S. Pub. No. 2012/0170313, U.S. Pub. No. 2012/0170317, U.S. Pub. No. 2012/0327682, U.S. Pat. No. 8,573,827, U.S. Pat. No. 8,602,631, U.S. Pub. No. 2012/0170318, U.S. Pub. No. 2013/0128614.

However, the conventional backlight module is generally configured by providing LEDs onto a circuit board, and the LEDs are electrically connected with the circuit board, so as to form an LED array, and then assembling the LED array into a light source accommodating space of the backlight module. Accordingly, in fabricating such a backlight module, the LEDs must be previously welded to the circuit board. Then, the circuit board, together with the LEDs welded thereon, is secured to light source accommodating space of the backlight module. As such, the process of the fabrication is relatively complex, and needs a high fabrication cost.

SUMMARY

Accordingly, the present disclosure is directed to provide a backlight module wherein the manufacturing process thereof is simplified and the fabrication cost is reduced.

One embodiment of the disclosure provides a backlight module including a light guide plate, a circuit layer and at least one light source. The light guide plate includes a first surface, a second surface parallel and opposite to the first surface, and a recess disposed at a side edge of the light guide plate and including a third surface parallel to the first surface and the second surface. The circuit layer is integrated with the third surface. The at least one light source is disposed on the third surface to be embedded in the recess and electrically connected to the circuit layer.

One embodiment of the disclosure provides a backlight module including a light guide plate, a circuit layer and at least one light source. The light guide plate includes a first surface, a second surface parallel and opposite to the first surface, and a recess disposed on the first surface of the light guide plate and including a third surface parallel to the first surface and the second surface. The circuit layer is integrated with the third surface. The at least one light source is disposed on the third surface to be embedded in the recess and electrically connected to the circuit layer.

One embodiment of the disclosure further provides a backlight module including a light guide plate, a circuit layer and at least one light source. The light guide plate includes a first surface, a second surface parallel and opposite to the first surface, and at least one recess disposed on a side edge of the light guide plate and including a third surface parallel to a normal direction of the first surface and the second surface. The circuit layer is integrated with the third surface. The at least one light source is disposed on the third surface to be embedded in the recess and electrically connected to the circuit layer.

According to an embodiment of the disclosure, the light source is a flip chip light-emitting diode (LED).

According to an embodiment of the disclosure, the light source is a LED chip scale package (CSP).

According to an embodiment of the disclosure, the recess is a groove parallel to a short axis of the light guide plate.

According to an embodiment of the disclosure, the backlight module further includes a tapering portion located at a side of the recess and protruded from the first surface.

According to an embodiment of the disclosure, a side surface of the tapering portion is coplanar with a light incident surface of the recess.

According to an embodiment of the disclosure, the recess is disposed at a middle point of a long axis of the light guide plate.

According to an embodiment of the disclosure, the recess is a groove crossing the first surface and parallel to a short axis of the light guide plate.

According to an embodiment of the disclosure, the recess is a groove crossing a side surface of the light guide plate and connecting the first surface and the second surface.

According to an embodiment of the disclosure, the number of the recess is plural and the number of the light source is plural, the recesses are arranged along a short axis of the light guide plate with predetermined intervals, and the light sources are disposed in the recesses respectively.

Based on the description described above, the backlight module of the present disclosure includes a light guide plate, a circuit layer and at least one light source. The light guide plate includes at least one recess. The circuit layer integrated with a surface of the recess, so the light source is directly embedded in the recess by electrically connected to the circuit layer without firstly being mounted to a circuit board. Therefore, the fabrication process of the backlight module of the present disclosure can be simplified, and the fabrication cost of backlight module of the present disclosure can also be reduced.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Accordingly, the drawings and descriptions will be regarded as illustrative in nature and not as restrictive.

Figure 1:
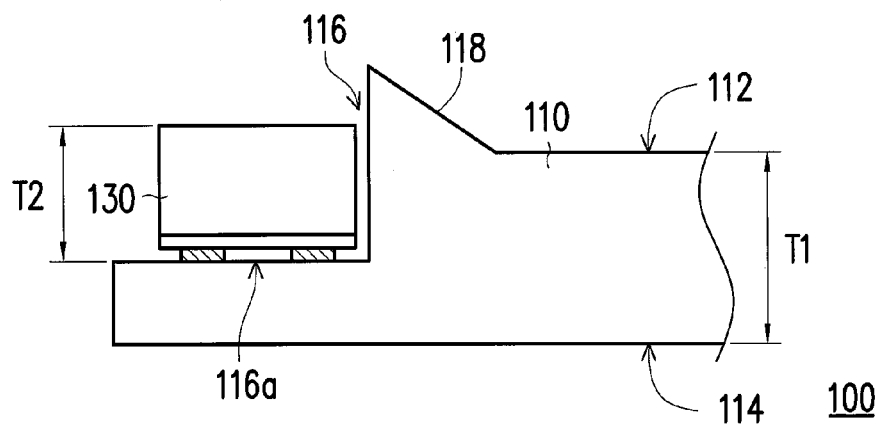
FIG. 1 is a cross-sectional view of a backlight module according to an exemplary embodiment.
Figure 2:
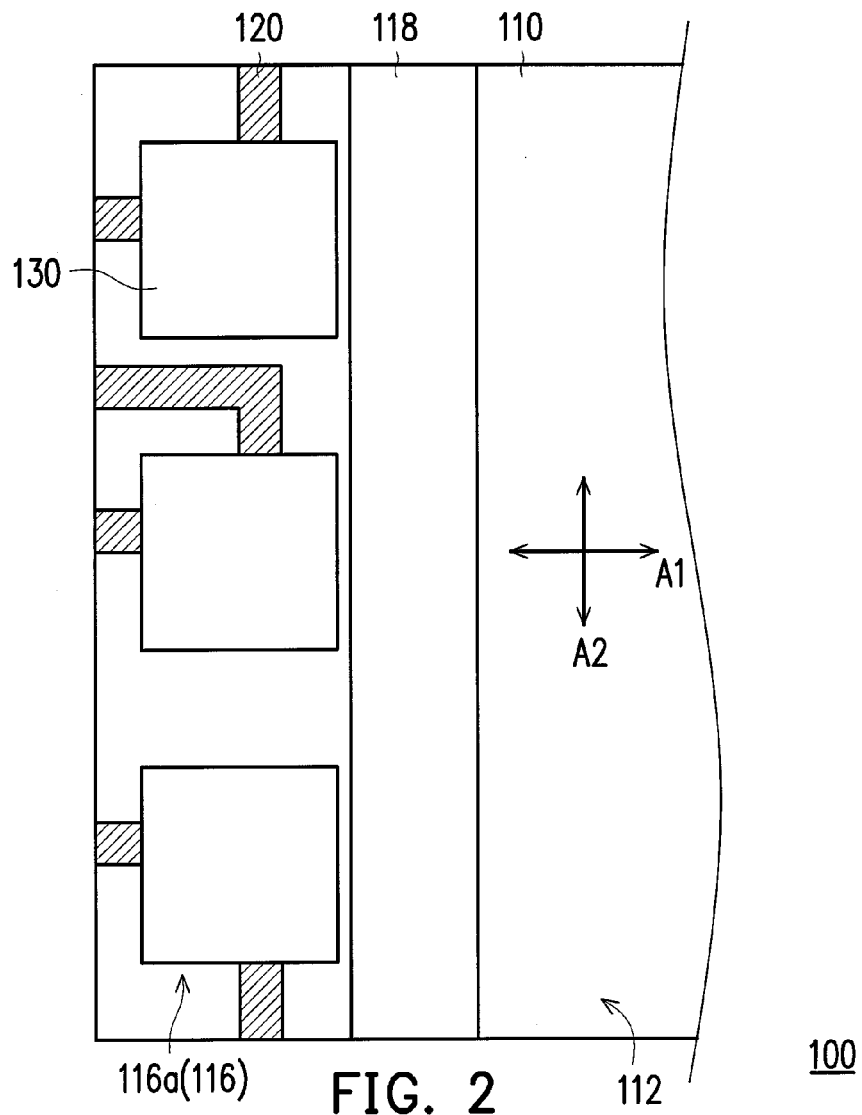
FIG. 2 is a top view of the backlight module in FIG. 1.

FIG. 1 is a cross-sectional view of a backlight module according to an exemplary embodiment. FIG. 2 is a top view of the backlight module in FIG. 1. Referring to both FIG. 1 and FIG. 2, in the present embodiment, the backlight module 100 includes a light guide plate 110, a circuit layer 120 and at least one light source 130. The light guide plate 110 includes a first surface 112, a second surface 114 and a recess 116, wherein the second surface 114 is parallel and opposite to the first surface 112, and the recess 116 is disposed at a side edge of the light guide plate 110 as shown in FIG. 1. The recess 116 includes a third surface 116a parallel to the first surface 112 and the second surface 114. More specifically, the third surface 116a may be the bottom surface of the recess 116 to be parallel to the first surface 112 and the second surface 114. The circuit layer 120 is integrated with the third surface 116a of the recess 116, and the at least one light source 130 is disposed on the third surface 116a to be embedded in the recess 116 and electrically connected to the circuit layer 120.

In the present embodiment, the number of the at least one light source 130 is plural (illustrated as three in FIG. 2), which means the backlight module 100 of the present embodiment may include a plurality of light sources 130, and each of the light sources 130 is a flip chip light-emitting diode (LED). More specifically, each of the light sources 130 may be a LED chip scale package (CSP). It should be well understood that the present embodiment is merely for illustration, the present disclosure does not limit the number and the type of the light source 130.

In detail, the circuit layer 120 may include a sheet material and a plurality of wirings. The wiring may be printed on the sheet material, and the sheet material with the wiring printed thereon may be integrated with the third surface 116a of the recess 116 by technique such as In-Mold roller (IMR), In-Mold Decoration (IMD), or In-Mold Forming (IMF). Thereby, the light sources 130 are disposed on the third surface 116a and electrically connected to the wirings of the circuit layer 120 as shown in FIG. 2. It is noted that the present embodiment is merely for illustration, the present disclosure does not limit the manufacturing method of the circuit layer 120.

Specifically, the light guide plate 110 includes a long axis A1 and a short axis A2, wherein the long axis A1 is parallel to a long side of the light guide plate 110, and the short axis A2 is parallel to a short side of the light guide plate 110. In the present embodiment, the recess 116 is a groove, and is parallel to the short axis A2 of the light guide plate 110. In other words, the recess 116 is located at the edge of the short side of the light guide plate 110 parallel to the short axis A2 as shown in FIG. 2.

In the present embodiment, the thickness T1 of the light guide plate 110 is about 0.2 mm to 0.7 mm, and the thickness T2 of the light source 130 is about 0.3 mm. As such, when the light source 130 is disposed on the third surface 116a to be embedded in the recess 116, it is possible for the top surface of the light source 130 to be higher than the first surface 112, so some of the light emitted by the light source 130 may not be entering the light guide plate 110. Accordingly, the backlight module 100 may optionally include a tapering portion 118 located at a side of the recess 116 and protruded from the first surface 112 as shown in FIG. 1. A side surface of the tapering portion 118 is coplanar with a light incident surface of the recess 116. Namely, the light incident surface of the light guide plate 110 can be extended by the disposition of the tapering portion 118, so light emitted by the light source 130 can all enter the light guide plate 110 and be transmitted therein.

As the disposition described above, the circuit layer 120 of the backlight module 100 is integrated with the third surface 116a of the recess 116, wherein the third surface 116a is parallel to the first surface 112 and the second surface 114 of the light guide plate 110, so the light source 130 is directly embedded in the recess 116 by electrically connected to the circuit layer 120 without firstly being mounted to a circuit board. Therefore, the fabrication process of the backlight module 100 of the present embodiment can be simplified, and the fabrication cost of backlight module 100 can also be reduced.

Figure 3:
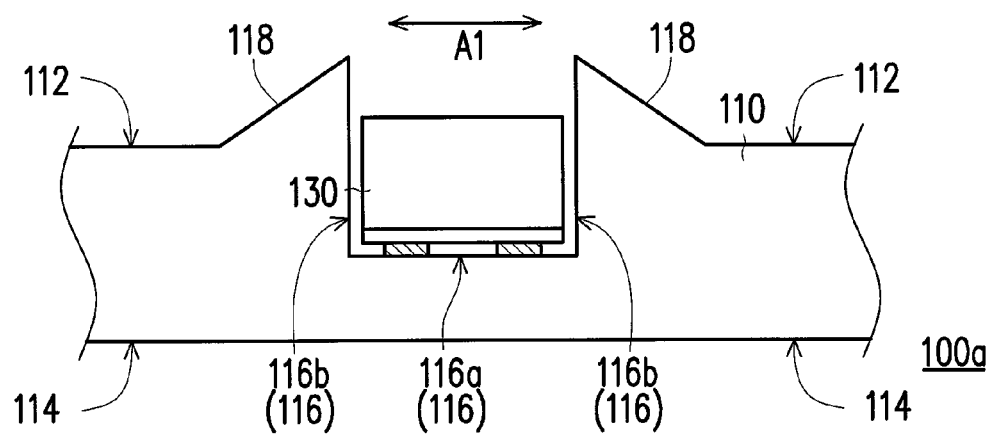
FIG. 3 is a cross-sectional view of a backlight module according to an exemplary embodiment.
Figure 4:
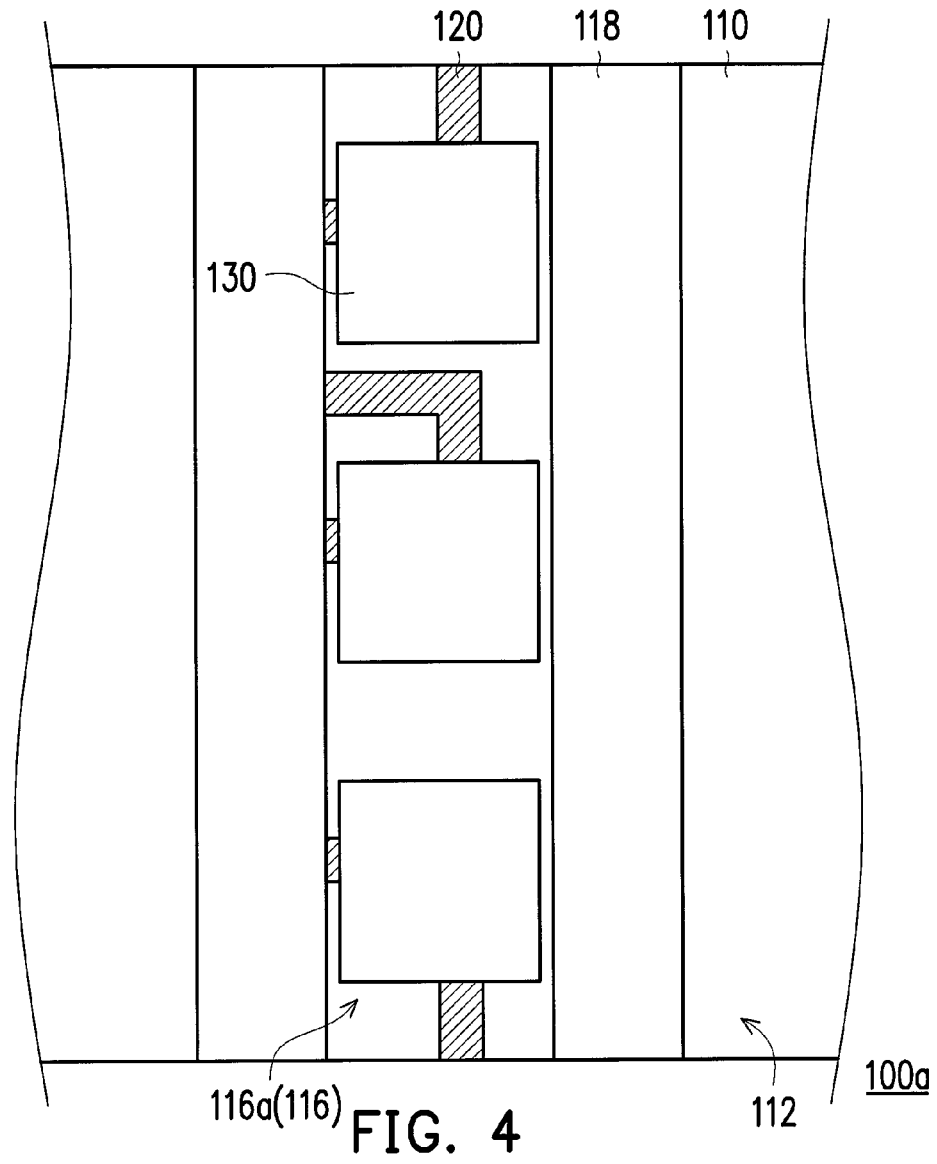
FIG. 4 is a top view of the backlight module in FIG. 3.

FIG. 3 is a cross-sectional view of a backlight module according to an exemplary embodiment. FIG. 4 is a top view of the backlight module in FIG. 3. Referring to both FIG. 3 and FIG. 4, it is noted that the backlight module 100a shown in FIG. 3 and FIG. 4 contains many features same as or similar to the backlight module 100 disclosed earlier with FIG. 1 and FIG. 2. For purpose of clarity and simplicity, detail description of same or similar features may be omitted. The main differences between the backlight module 100a shown in FIG. 3 and the backlight module 100 shown in FIG. 1 are described herein.

Referring to both FIG. 3 and FIG. 4, in the present embodiment, the recess 116 is disposed on the first surface 112 of the light guide plate 110 and the recess 116 includes a third surface 116a parallel to the first surface 112 and the second surface 116 of the light guide plate 110. The circuit layer 120 is integrated with the third surface 116a, and the light source 130 is disposed on the third surface 116a to be embedded in the recess 116 and electrically connected to the circuit layer 120. In details, the light guide plate 110 includes a long axis A1 and a short axis A2, wherein the long axis A1 is parallel to a long side of the light guide plate 110, and the short axis A2 is parallel to a short side of the light guide plate 110. As such, the recess 116 is a groove, which crosses the first surface 112 and is parallel to the short axis A2 of the light guide plate 110 as shown in FIG. 4. To be more specific, the light guide plate 110 may be disposed at a middle point of the long axis A1 of the light guide plate 110. In other words, the recess 116 is located at the middle point of the long side of the light guide plate 110 parallel to the short axis A2 as shown in FIG. 4.

In the present embodiment, the backlight module 100a may optionally include a tapering portion 118 located at a side of the recess 116 and protruded from the first surface 112 as shown in FIG. 3. A side surface of the tapering portion 118 is coplanar with a light incident surface 116b of the recess 116. Namely, the light incident surface 116b of the light guide plate 110 can be extended by the disposition of the tapering portion 118, so light emitted by the light source 130 can all enter the light guide plate 110 and be transmitted therein.

Figure 5:
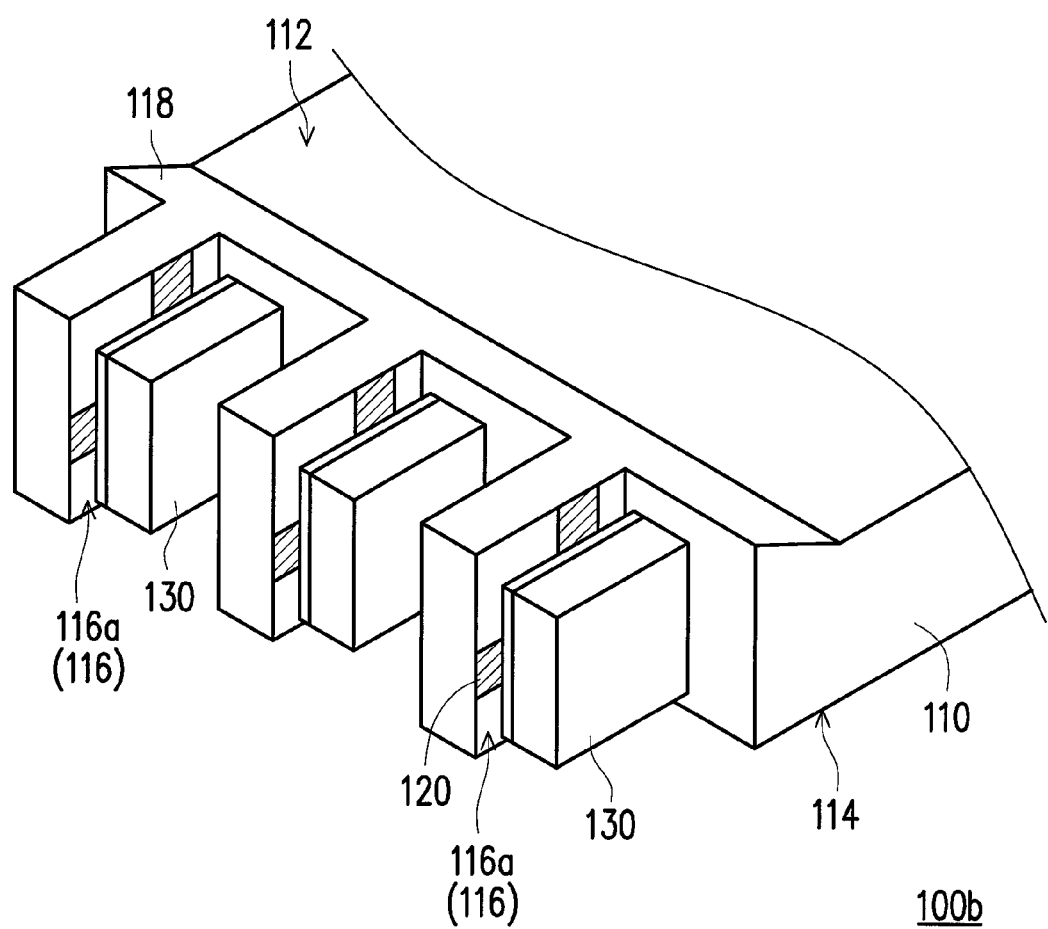
FIG. 5 is a schematic view of a backlight module according to an exemplary embodiment.
Figure 6:
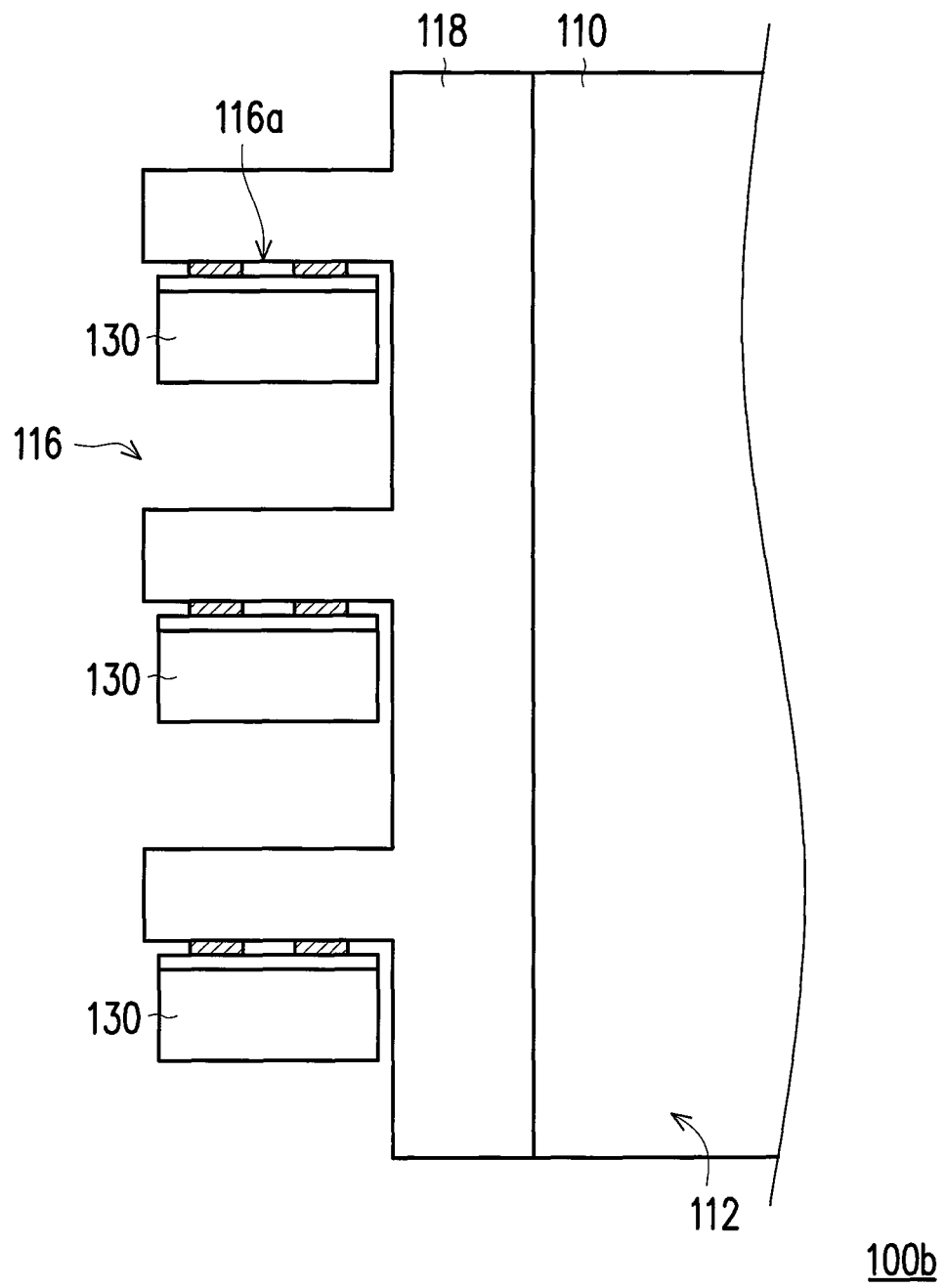
FIG. 6 is a top view of the backlight module in FIG. 5.

FIG. 5 is a schematic view of a backlight module according to an exemplary embodiment. FIG. 6 is a top view of the backlight module in FIG. 5. It is noted that the backlight module 100b shown in FIG. 5 and FIG. 6 contains many features same as or similar to the backlight module 100 disclosed earlier with FIG. 1 and FIG. 2. For purpose of clarity and simplicity, detail description of same or similar features may be omitted. The main differences between the backlight module 100b shown in FIG. 5 and the backlight module 100 shown in FIG. 1 are described herein.

Referring to both FIG. 5 and FIG. 6, in the present embodiment, a backlight module 100b includes a light guide plate 110, a circuit layer 120 and at least one light source 130. The light guide plate 110 includes at least one recess 116, and the at least one recess 116 is disposed on a side edge of the light guide plate 110 and including a third surface 116a, which is parallel to a normal direction of the first surface 112 and the second surface 114 of the light guide plate 110 as shown in FIG. 5. The circuit layer 120 is integrated with the third surface 116a, and the at least one light source 130 is disposed on the third surface 116a to be embedded in the recess 116 and electrically connected to the circuit layer 120.

In detail, the number of the at least one light source 130 is plural (illustrated as three in FIG. 5), which means the backlight module 100b of the present embodiment may include a plurality of light sources 130. Accordingly, the number of the at least one recess 116 is plural and the number of the light source is plural (illustrated as three in FIG. 5), the recesses 116 are arranged along the short axis A2 of the light guide plate 110 with predetermined intervals, and the light sources 130 are disposed in the recesses 116 respectively. To be more specific, each of the recesses 116 is a groove crossing a side surface of the light guide plate 110 and connecting the first surface 112 and the second surface 114 of the light guide plate 110 as shown in FIG. 5.

In the present embodiment, the backlight module 100b may optionally include a tapering portion 118 located at a side of each recess 116 and protruded from the first surface 112 as shown in FIG. 5. Specifically, the tapering portion 118 are located at a short side of the light guide plate 110 where the recesses 116 are arranged along. A side surface of the tapering portion 118 is coplanar with a light incident surface of the recess 116. Namely, the light incident surface of the light guide plate 110 can be extended by the disposition of the tapering portion 118, so light emitted by the light source 130 can all enter the light guide plate 110 and be transmitted therein.

In sum, a backlight module of the present disclosure includes a light guide plate, a circuit layer and at least one light source. The light guide plate includes at least one recess. The circuit layer integrated with a surface of the recess, so the light source is directly embedded in the recess by electrically connected to the circuit layer without firstly being mounted to a circuit board. Therefore, the fabrication process of the backlight module of the present disclosure can be simplified, and the fabrication cost of backlight module of the present disclosure can also be reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A backlight module, comprising:
   a light guide plate comprising a first surface, a second surface parallel and opposite to the first surface, and a recess disposed at a side edge of the light guide plate and comprising a third surface parallel to the first surface and the second surface;
   a circuit layer integrated with the third surface; and
   at least one light source disposed on the third surface to be embedded in the recess and electrically connected to the circuit layer.

2. The backlight module in claim 1, wherein the light source is a flip chip light-emitting diode (LED).

3. The backlight module in claim 1, wherein the light source is a LED chip scale package (CSP).

4. The backlight module in claim 1, wherein the recess is a groove parallel to a short axis of the light guide plate.

5. The backlight module in claim 1, further comprising a tapering portion located at a side of the recess and protruded from the first surface.

6. The backlight module in claim 5, wherein a side surface of the tapering portion is coplanar with a light incident surface of the recess.

7. A backlight module, comprising:
a light guide plate comprising a first surface, a second surface parallel and opposite to the first surface, and a recess disposed on the first surface of the light guide plate and comprising a third surface parallel to the first surface and the second surface;
a circuit layer integrated with the third surface; and
at least one light source disposed on the third surface to be embedded in the recess and electrically connected to the circuit layer.

8. The backlight module in claim 7, wherein the recess is disposed at a middle point of a long axis of the light guide plate.

9. The backlight module in claim 7, wherein the recess is a groove crossing the first surface and parallel to a short axis of the light guide plate.

10. The backlight module in claim 7, wherein the light source is a flip chip light-emitting diode (LED).

11. The backlight module in claim 7, wherein the light source is a LED chip scale package (CSP).

12. The backlight module in claim 7, further comprising at least one tapering portion located on at least one side of the recess and protruded from the first surface.

13. The backlight module in claim 12, wherein a side surface of the tapering portion is coplanar with a light incident surface of the recess.

14. A backlight module, comprising:
a light guide plate comprising a first surface, a second surface parallel and opposite to the first surface, and at least one recess disposed on a side edge of the light guide plate and comprising a third surface parallel to a normal direction of the first surface and the second surface;
a circuit layer integrated with the third surface; and
at least one light source disposed on the third surface to be embedded in the recess and electrically connected to the circuit layer.

15. The backlight module in claim 14, wherein the recess is a groove crossing a side surface of the light guide plate and connecting the first surface and the second surface.

16. The backlight module in claim 14, wherein the number of the recess is plural and the number of the light source is plural, the recesses are arranged along a short axis of the light guide plate with predetermined intervals, and the light sources are disposed in the recesses respectively.

17. The backlight module in claim 14, wherein the light source is a flip chip light-emitting diode (LED).

18. The backlight module in claim 14, wherein the light source is a LED chip scale package (CSP).

19. The backlight module in claim 14, further comprising a tapering portion located on a side of the recess and protruded from the first surface.

20. The backlight module in claim 19, wherein a side surface of the tapering portion is coplanar with a light incident surface of the recess.

* * * * *